United States Patent
Loibl

(10) Patent No.: US 8,365,789 B2
(45) Date of Patent: Feb. 5, 2013

(54) METHOD FOR HOT LAMINATING A SHEET

(75) Inventor: Bernd Loibl, Klettgau (DE)

(73) Assignee: Monolith GmbH Buerosysteme, Essen (DE)

( * ) Notice: Subject to any disclaimer, the term of this patent is extended or adjusted under 35 U.S.C. 154(b) by 0 days.

(21) Appl. No.: 13/304,938

(22) Filed: Nov. 28, 2011

(65) Prior Publication Data

US 2012/0067504 A1 Mar. 22, 2012

Related U.S. Application Data

(63) Continuation of application No. 12/799,316, filed on Apr. 22, 2010.

(60) Provisional application No. 61/282,083, filed on Dec. 14, 2009.

(51) Int. Cl.
*B32B 41/00* (2006.01)

(52) U.S. Cl. ........ 156/360; 156/362; 156/363; 156/364; 156/583.1; 156/583.2; 156/583.3; 156/583.91

(58) Field of Classification Search ........... 156/360, 156/362, 363, 364, 378, 583.1, 583.2, 583.3, 156/583.91
See application file for complete search history.

(56) References Cited

U.S. PATENT DOCUMENTS

| | | | |
|---|---|---|---|
| 4,234,300 A | | 11/1980 | Yamagisi et al. |
| 5,368,677 A | * | 11/1994 | Ueda et al. ............ 156/362 |
| 6,315,020 B1 | * | 11/2001 | Seki ........................ 156/351 |
| 2001/0039998 A1 | | 11/2001 | Senges |
| 2002/0177005 A1 | | 11/2002 | Yamashita |
| 2004/0050500 A1 | | 3/2004 | Lemens et al. |
| 2006/0213621 A1 | | 9/2006 | Loibl |
| 2006/0254720 A1 | | 11/2006 | Loibl |
| 2010/0059184 A1 | * | 3/2010 | Pan ........................ 156/378 |
| 2011/0064337 A1 | | 3/2011 | Barthel et al. |

FOREIGN PATENT DOCUMENTS

| | | |
|---|---|---|
| DE | 197 44 595 A 1 | 4/1999 |
| DE | 201 00 328 U 1 | 5/2001 |
| DE | 100 04 486 A1 | 8/2001 |
| DE | 100 04 486 A 1 | 8/2001 |
| DE | 20 2005 005 020 U1 | 8/2005 |
| DE | 600 29 505 T2 | 2/2007 |
| DE | 20 2009 000903 U1 | 2/2010 |
| EP | 1 724 111 A2 | 11/2006 |
| WO | WO 01/56787 A1 | 8/2001 |

* cited by examiner

*Primary Examiner* — George Koch
(74) *Attorney, Agent, or Firm* — Friedrich von Rohrscheldt

(57) ABSTRACT

The invention relates to a laminating foil having an initial roughness on at least one side, which makes the laminating foil matte, wherein the laminating foil has a marking configured as a surface pattern with surface portions on the matte side or at least on one of the matte sides, wherein the roughness of the surface portions is different from the initial roughness. The invention furthermore relates to a laminating foil set comprising the laminating foils, a method for hot laminating sheet material using such laminating foils, a laminating unit for using the laminating foil, and eventually a laminating system including the laminating unit and the laminating foils.

19 Claims, 4 Drawing Sheets

METHOD FOR HOT LAMINATING A SHEET

RELATED APPLICATIONS

This application is a continuation of application Ser. No. 12/799,316 filed on Apr. 22, 2010 which claims priority from and incorporates by reference U.S. provisional patent application 61/282,083, filed on Dec. 14, 2009.

FIELD OF THE INVENTION

The invention relates to a method for hot laminating sheet material according to claim 1, a laminating foil suitable for the method according to claim 10, a laminating foil set according to claim 16, a laminating unit according to claim 17 and a laminating system including a laminating unit and including a laminating foil set according to claim 24.

BACKGROUND OF THE INVENTION

In order to protect sheet material in particular valuable documents it is known to hot seal the sheet material with a laminating foil. This is done in the non industrial field, this means in the office and personal field through laminating units typically configured as table top units. Such laminating units are known e.g. from DE 20 2005 005 020 U1; and in combination with a cutting unit, they are known from EP 1 724 111 A2. They have essentially the same configuration; this means a housing in which a laminating apparatus is disposed. Between a feed opening on one side and an exit opening on the other side of the housing a pass through channel extends through the housing, wherein the laminating apparatus is associated with the pass through channel. The latter typically comprises at least one pair of rollers, possibly also several pairs of rollers, made of two respective laminating rollers disposed on top of one another and forming a laminating gap, wherein the laminating gap is adjusted, so that the combination of sheet material and laminating foil in the laminating gap is exposed to substantial pressure. In hot laminating units at least one of the laminating rollers, typically both are heated, so that the combination of sheet material and laminating foil is also heated additionally. During passage the laminating foils are glued together with the sheet material to be heat-sealed there between.

Typically, the sheet material is heat-sealed in between two foil sheets forming a laminating foil. These can be loose foil sheets or foil webs which are rolled up within the laminating unit and which are pulled off from the rollers during the laminating process, wherein the separation is provided through cutting apparatuses (re. US 2004/0050500 A1). Instead, the two foil sheets can also be provided in the form of a laminating foil pouch, wherein the two foil sheets are connected with one another at least at one lateral edge. Such laminating foils are known e.g. from DE 197 44 595 A1 and DE 201 00 328 U1. The foil sheets are configured as composite foils, wherein a transparent clear foil e.g. made from polypropylene is provided with a heat resistant glue layer which is made e.g. from EVA (Ethylen-Vinylacetate-Copolymer) (Re. DE 600 29 505 T2).

For the time being, laminating foils with a thickness of 30 μm to 500 μm are commercially available. Selecting the foil thickness can provide a desired flexibility or stiffness to the laminated sheet material. It is implied that more thermal energy has to be provided for hot sealing thick laminating foils, than has to be provided for hot sealing thin laminating foils made of the same materials. Laminating units, which are configured for processing laminating foils with different thickness therefore have to be adaptable to the thickness of the respective thickness of the laminating foil to be processed, so that on the one hand sufficient thermal energy is provided for welding the sheet material, on the other hand the laminating foil does not overheat so that it is damaged. Therefore such laminating units comprise adjustment apparatuses through which the temperature of the laminating apparatus and/or the pass through velocity can be adapted to the respective thickness of the laminating foil by hand.

However, in practical applications it has become apparent that there are always operator errors, in particular when, as in large offices, many persons have access to a laminating unit. An operator error has the consequence that the lamination is insufficient for a heat impact which is too small, thus the laminated sheet material is not protected sufficiently or that the laminating foil overheats for excessive heat impact and thus sticks to the laminating rollers which causes severe damages to the laminating unit. Furthermore, the laminated sheet material is damaged, so it is unreadable. The latter condition is mostly non repairable and in the worst case causes the destruction of the document.

DE 100 04 486 A1 discloses a cartridge laminating unit in which a control and/or regulation apparatus is provide through which control elements can be controlled which influence the laminating process as a function of properties of the respective cover to be laminated, which properties are detected by a sensor, wherein the control elements are e.g. the heating apparatus for adjusting a particular laminating temperature and/or a drive apparatus for adjusting a particular laminating speed and/or a press apparatus for adjusting a particular laminating pressure. For this purpose the roll film cartridge has a machine readable encoding strip on its outer surface, e.g. a typical bar code strip. Alternatively, the encoding can also be provided directly at the roll film and can e.g. be detected through a window in the cartridge wall, or at an end of the roll film which protrudes from the output slot. It is also conceivable that the roll film cartridge or the roll film is provided with a mechanically detected marking which can be detected by a detector and which can be converted into an electrical sensor signal which can be transmitted to a control unit.

BRIEF SUMMARY OF THE INVENTION

It is the object of the invention to provide a method of this type for hot laminating sheet material in which operator errors for the laminating unit when using laminating foils with different thickness and different materials are reduced or completely avoided. Other objects are to provide a laminating foil configured for the method and a laminating foil set comprised of a plurality of such laminating foils, a laminating unit particularly configured for the laminating foil set and a system including a laminating unit and a laminating foil set.

The method according to the invention is implemented in that a laminating foil is being used, whose initial roughness is at least on one side greater than the end roughness after laminating, wherein the laminating foil is at least on this one side provided with a marking in the form of a two dimensional pattern which has surface portion whose roughness differs from the initial roughness, wherein the marking can be read out by a sensor of the laminating unit, wherein the laminating foil with its marking is run past the sensor, wherein the sensor reads out the marking and generates a signal which is characteristic for the marking and the temperature and/or the pass through velocity is adjusted as a function of the signal.

It is the core idea of the invention to provide a method in which the laminating foil is provided with a marking characterizing its thickness and/or material, and the laminating foil is used in combination with a laminating unit, which comprises a sensor for reading out the marking and for generating a signal, which is characteristic for the marking, wherein the temperature and/or the rotation speed is adjusted as a function of the respective adjusted marking or of the signal generated by the sensor. Thus, there is the option in principle to use the signal for a display, according to which the operator adjusts the temperature and/or the pass-through velocity through a respective interface according to the display. Thus, the display can represent a code, or the temperature to be adjusted and/or the pass-through velocity. This significantly reduces the risk of operator error. It is excluded completely, when the signal generated by the sensor is passed on to a control apparatus for automatically adjusting the temperature and/or the pass-through velocity. For this method, there is no more manual interference. The laminating result is proper, regardless which thickness and/or which material the laminating foil has, and operator errors cannot occur anymore.

The method according to the invention uses a laminating foil whose initial roughness is at least on one side greater than the end roughness after the laminating process, wherein the laminating foil is provided with a surface pattern as a marking, at least on this one side, which surface pattern has surface portions whose roughness differs from the initial roughness, and is in particular lower than the initial roughness, but not lower than the final roughness. Thus, the starting point is a laminating foil, which is known in principle, in which at least one side has an initial roughness, which is typically large enough, so that the laminating foil is matte or opaque, thus translucent at best. It is the object of this configuration to reduce the adhesion of laminating foils or foil sheets of a laminating foil at one another due to static electricity. Thus, typically the initial roughness is caused by the glue applied. For the method according to the invention, this configuration of the laminating foil is used in a manner, so that a surface pattern is provided on the side provided with the initial roughness, preferably by smoothing particular surface portions, which surface pattern is then scanned by the sensor. It is the advantage of this type of marking, that the surface pattern disappears during the laminating process, thus it is not detectable anymore at the laminated end product, since the surface areas with the initial roughness, typically the glue layer and possibly also the surface portions of the surface pattern, are melted so that the respective side becomes evenly smooth over its entire surface, and thus also evenly transparent.

With respect to the type and extension of the surface pattern, there are no real restrictions. A contrast between the surface portions and the initial roughness should be provided, so that the contrast is detectable by the sensor, preferably in that the surface portions of the surface patterns are already smoothed out, so that they have the final roughness after the laminating process. Markings can be produced very easily, in which the surface portions are configured as parallel and offset line portions. This way, the distance and/or the width and/or the number of the line portions can be scanned. The line portions are produced in a simple manner in that the laminating foil is initially provided with the initial roughness on the side provided for this purpose, and the laminating foil is subsequently run over rollers, which produce the line portions by smoothing the initial roughness.

The line portions can be limited with respect to their extension to a portion which is detected by the sensor. However, for ease of manufacture, it is useful to have the line portions extend over the entire width or length of the laminating foil. Thus, for a good readout of the line portions, it is advantageous when the line portions extend transversally to the pass-through movement through the laminating unit. Depending on the orientation of the readout direction of the sensor, the line portions can also extend at a slant angle to the pass-through direction, or parallel thereto.

The differentiation of the laminating foil with respect to its thickness and/or material can be provided when configuring the surface portions as line portions in that the distance and/or the width of the line portions is configured the greater, the thicker or the thinner the laminating foil is. Thus, the differentiation can be performed solely through the distance or solely through the width of the line portion, but also through different distances and widths of the line portions. Thus, the distance of the line portions can be configured the larger and the width of the line portions can be configured the smaller, the thicker the laminating foil is, or the thinner the laminating foil is.

In principle, the method according to the invention can also be performed using foil webs wound onto rollers, wherein the rollers are disposed within the laminating unit. The foil webs are then joined in the laminating unit, so that they enclose the sheet material to be heat-sealed. The separation is subsequently performed through a cutting apparatus.

In a known manner, however, laminating foils shall also be used for the method according to the invention, which are made of a pair of foil sheets with the sheet material then inserted there between. This way, the sheet material is protected on both sides through the laminating foil. Thus, as it is also known, at least one foil sheet, better both foil sheets, shall have the initial roughness, thus shall be matte or opaque on the side respectively facing towards the other foil sheet. This way, the foil sheets can be separated better from one another for inserting the sheet material. Preferably, laminating foils should be used, whose foil sheets are connected with one another at least at one edge, so that it is assured that they are placed on top of one another during the laminating process, so that they are in full surface contact with one another and so that their edges are aligned (re. DE 197 44 595 A1 and DE 201 00 328 U1). Thus, it typically suffices when only one of the two foil sheets is provided with the marking.

An optical sensor can be used for reading out the marking. For example, laser sensors and laser scanners, are suitable for this purpose, which scan the marking over a particular distance or a particular angle.

In order to be able to process a large spectrum of thicknesses of laminating foils, the laminating gap, through which the combination of laminating foil and sheet material is run for introducing the pressure, should be adjustable, wherein it is provided according to the invention that the signal generated by the laser is then also used for adjusting the height of the laminating gap, either the adjustment is performed as a function of a display of the signal by hand, or automatically through the recited control apparatus.

The object for the laminating foil itself is accomplished according to the invention in that the laminating foil has an initial roughness, at least on one side, which makes the laminating foils matte or opaque, and that the laminating foil has a marking in the form of a surface pattern on the matte side, which surface pattern has surface portions, whose roughness differs from the initial roughness and is thicker in particular than the initial roughness. The surface pattern can be scanned by a sensor, which is associated with a laminating unit, which is also an object of the present invention. Thus, the surface pattern can be adapted in a differentiating manner to the respective thickness and/or the respective material of the laminating foil; this means a characteristic surface pattern can be associated with each thickness or each material. Separate from that, the laminating foil can be configured as described supra in detail in the context of the method according to the invention.

An object of the invention is also a laminating foil set with laminating foils with different thickness and/or different material, wherein the laminating foils have respective markings which are characteristic for their respective thickness and their respective material, and are provided in the form of a surface pattern with surface portions on the matte side or at least on one of the matte sides, wherein the roughness of the surface portions differs from the initial roughness.

Regarding the laminating unit, the respective object is accomplished according to the invention in that the laminating unit has a sensor which is configured for reading out a marking configured as a surface pattern on the laminating foil, which surface pattern includes surface portions, whose roughness differs from an initial roughness on at least one side of the laminating foil, wherein the sensor as a function of the read out marking generates a signal for a display apparatus and/or for a control apparatus, which is connected to the laminating apparatus and/or the transport apparatus and configured, so that the control apparatus adjusts the temperature of the laminating apparatus and/or the pass-through velocity of the transport apparatus as a function of the read out marking. The idea is also here to provide a prerequisite for adapting the temperature and/or the pass-through velocity to the laminating foil respectively used, and thus to use a sensor which is configured to read out the different markings configured as surface portions of a surface pattern described supra according to certain criteria, wherein the surface portions differ with respect to their roughness from the initial roughness of the laminating foil, e.g. by counting line portions over a particular readout distance or distances, etc. In this case, the criterion is the number and/or the distance of the line portions.

Thus, the invention relates to two variants of the laminating unit. For the one variant, the signal respectively generated is displayed, e.g. in the form of a code or as information regarding the thickness of the laminating foil or as information regarding the temperature to be adjusted and/or the pass-through velocity to be adjusted, wherein the operator then predetermines the temperature and/or the pass-through velocity through the adjustment apparatus already provided in the prior art units. In a second preferred embodiment, the signal for controlling a control apparatus is used, through which the temperature and/or the pass-through velocity is automatically adjusted according to the signal or the marking on the laminating foil, so that no manual interference is required insofar. It is appreciated that both variants can also be combined with one another, this means that a display of the laminating foil thickness, the temperature and/or the pass-through velocity is provided to the operator for information purposes only also for the automatic variant.

As a configuration for the laminating unit according to the invention, it is provided that the laminating apparatus comprises at least one roller pair with two laminating rollers forming a laminating gap, wherein at least one of the rollers of the pair can be heated through a heating apparatus, preferably both. Thus, at least one of the laminating rollers should be part of the transport apparatus, wherein the transport apparatus then has an electrical drive through which the laminating rollers are rotatable, and which drive is connected to the control apparatus.

It is helpful when the sensor for reading out the marking is disposed in pass-through direction in front of the laminating apparatus, so that the marking can be read out before reaching the laminating apparatus and the laminating apparatus is then adjusted with respect to temperature and pass-through velocity, before the combination of laminating foil and sheet material has reached the laminating apparatus. A preferred embodiment is provided when the sensor is disposed outside of the housing, preferably so that a sheet support is provided at the housing as an extension of the pass-through channel beyond the feed opening, wherein the sensor is then associated with the sheet support. This sheet support is advantageously integrated in the sheet feeder. This provides the option to reconfigure existing laminating units in a simple manner.

As stated supra, in particular an optical sensor is suitable as a sensor and herein, in particular, a laser scanner. The laser should be suitable to read out surface portions with different reflectivity and/or absorption.

According to another feature of the invention, it is provided that the sensor is movably supported transversal to the pass-through direction in the pass-through channel. For a laminating unit, which has two movable side stops in a known manner for centric insertion of the laminating foil into the pass-through channel, this can e.g. also be implemented in that the sensor is connected with one of the two side stops, so that when the side stops are adjusted for the format of the laminating foil, a proper association of the sensor is automatically provided.

In order for the laminating unit to also be suitable for a broad range of laminating foil thicknesses, the height of the laminating gap generated by the laminating apparatus should be adjustable as a function of the signal of the sensor or should be automatically adjusted through a control apparatus. This way, the pressure acting upon the laminating foil can be kept in an optimum range, regardless of the thickness of the laminating foil.

The last portion of the object is accomplished according to the invention through a laminating system made of a laminating unit and a laminating foil set with various thicknesses and/or various materials, wherein the laminating unit is configured as stated supra in detail, and wherein the laminating foil set has laminating foils with at least one marking characteristic for its respective thickness and/or its respective material in the form described supra. The laminating unit and the laminating foils are thus adjusted to one another, so that the laminating unit is capable by means of the sensor to read out the respective markings on the laminating foils of the laminating foil set, and to generate a display as a function of the readout marking and/or automatically adjust the temperature and/or the pass-through velocity in the laminating unit, so that an optimum laminating process is obtained and the completed laminated product has high quality.

BRIEF DESCRIPTION OF THE DRAWINGS

The invention is illustrated in the drawing figure in detail with reference to an embodiment, wherein:

FIG. 4 illustrates a slanted view of a front side and an upper side of the laminating unit according to FIGS. 1-3 with laminating foil passing through.

DETAILED DESCRIPTION OF THE INVENTION

Figure 1:
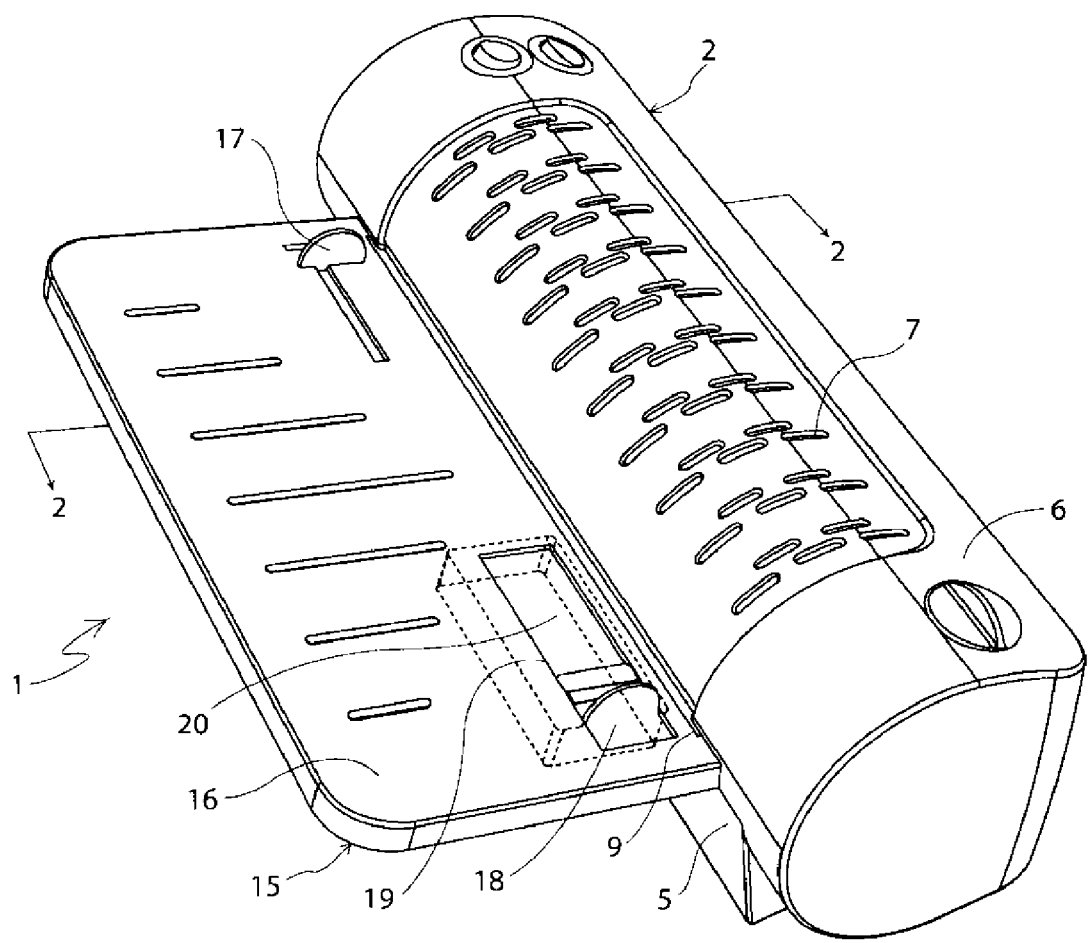
FIG. 1 illustrates a slanted view of the backside of the laminating unit according to the invention.

The laminating unit 1 illustrated in the drawing includes a housing 2 with a flat housing base 3, a front wall 4, a back wall 5 and an arc shaped top wall 6, connecting the front wall 4 and the back wall 5. The arc shaped top wall is provided with a plurality of cooling slots designated as 7 in an exemplary manner.

A downward slanted pass-through channel 8 extends from the back wall 5 to the front wall 4 through the housing 2 with a width, so that DIN A4 sheet material can be run through in landscape format. The pass-through channel 8 is defined on the input side by a feed opening 9 in the rear wall 5 and an exit opening 10 in the front wall 4.

Approximately in the center of the pass-through channel 8, there is a laminating apparatus 11, of which two laminating rollers 12, 13 are visible, which are disposed on top of one another with their rotation axis parallel to one another. The laminating rollers 12, 13 extend over the entire width of the pass-through channel 8 and form a laminating gap 14 between one another. The laminating rollers 12, 13 are heated, so that they can be heated to temperatures between 80° C. and 140° C. They also form a portion of a transport apparatus, part of which is a drive with an electric motor, which is not shown here in more detail herein, which drive synchronously drives the laminating rollers 12, 13, and thus the upper laminating roller 12 clockwise and the lower laminating roller 13 counterclockwise. Their circumferential velocities are identical.

A sheet support 15 is disposed at the rear wall 5, whose top side 16 contacts the lower side of the pass-through channel 8 flush, and which is inclined in the same direction as the pass-through channel 8 itself. Adjacent to the pass-through opening 9, two support bars 17, 18 protrude beyond the top side 16 of the sheet support 15, which support bars are disposed opposite to one another and movable in opposite directions due to mechanical coupling, so that the center of the gap between the two of them does not move for an adjustment. This way the distance of the support bars 17, 18 can be adapted to the format of the respective combination of laminating foil and sheet material to be laminated, so that both side walls of this combination are supported by the support bars 17, 18 when inserted into the pass-through channel 8 and the laminating foil runs into the pass-through channel 8 in the center.

A rectangular recess 19 is provided adjacent to the support bar 18 in the sheet support 15, below which recess, a laser scanner 20 is mounted at the bottom side of the sheet support 15, so that its laser window is oriented upward through the recess 19. This way, a laser beam generated by the laser scanner 20 can radiate upward through the recess 19. The laser scanner 20 is connected to the adjacent support bar 18, so that it moves together with a movement of the support bar 18, thus does not change its position with respect to this support bar 18.

The laser scanner 20 is connected to a control apparatus disposed in the housing 2, which transposes the signals received by the laser scanner 20 into control commands for the speed of the laminating rollers 12, 13 and/or its heating power through suitable software. For this purpose, the control apparatus is connected to a speed control for the drive and/or a temperature control for the heating apparatus for the laminating rollers 12, 13.

The height of the laminating gap 14, this means the free distance between the two laminating rollers 12, 13 is adjustable through vertical movement of the upper laminating roller 12. For this purpose, a drive with an electric motor is provided, which is also connected to the control apparatus recited supra, so that it is adjusted through the gap height of the laminating gap 14 as a function of the signal generated by the laser scanner 20.

Figure 3:
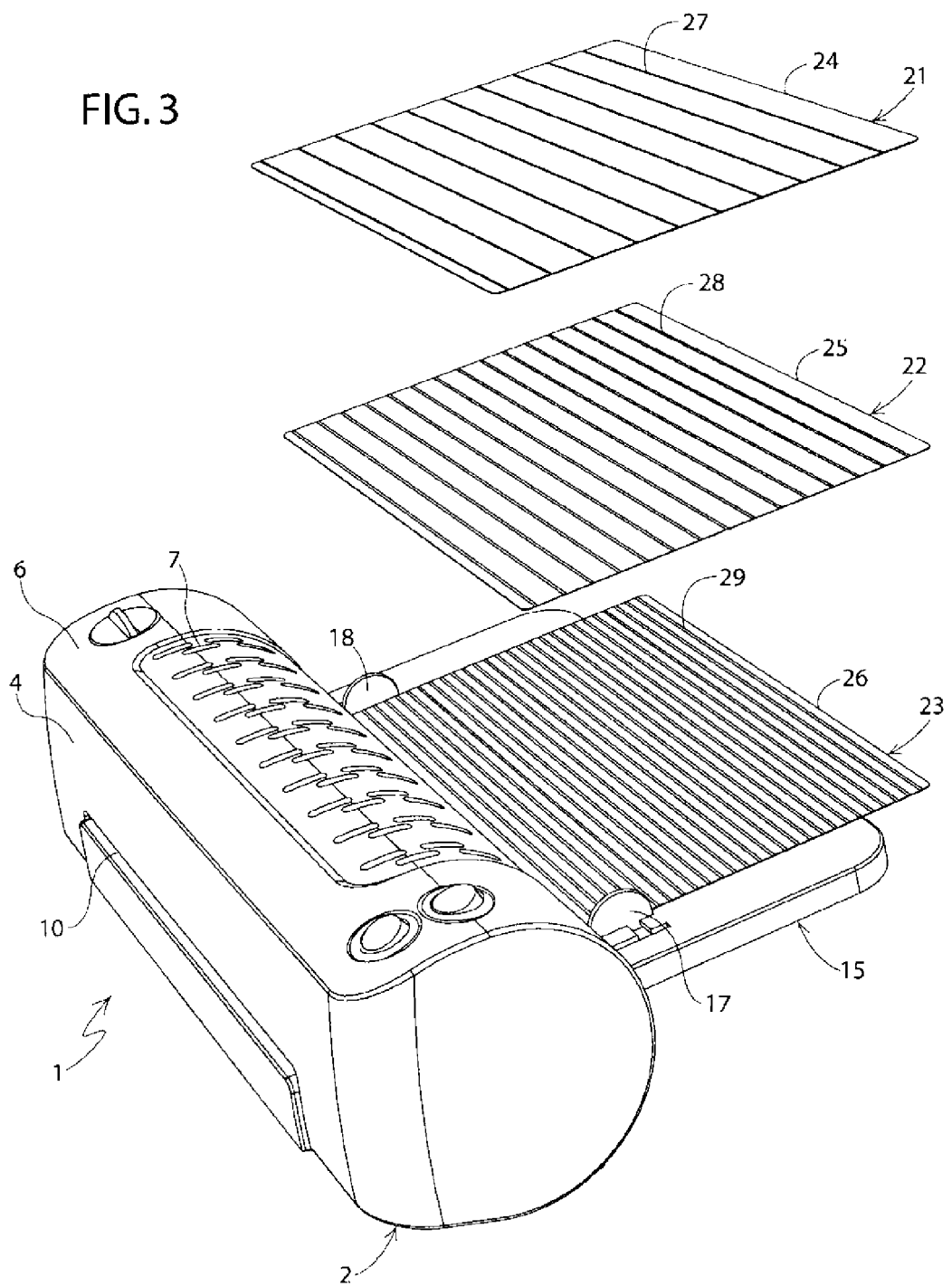
FIG. 3 illustrates a slanted view of the front side of the laminating unit according to FIGS. 1 and 2 with three laminating foils with various thickness.

FIG. 3 illustrates three laminating foils 21, 22, 23 configured with a respective distance on top of one another, wherein the lower laminating foil 23 is supported on the sheet support 15. The laminating foils 21, 22, 23 are, which is not illustrated here in detail, configured as laminating foil pouches, this means they are made of two foil sheets with identical size disposed in alignment on top of one another, which are connected with one another at an edge 24, 25, 26. After folding the two respective foil sheets apart from one another, the sheet material to be laminated can be inserted between the foil sheets.

The foil sheets of the laminating foils 21, 22, 23 are made from externally smooth and thus clear, transparently configured plastic foils. In order to be able to better fold the foil sheets apart from one another, both foil sheets have glue layers with such initial roughness on the sides facing one another, so that the surfaces are matte, and the foil sheets themselves, and thus also the combination of the laminating foils 21, 22, 23, in its entirety is not transparent, but at best translucent or matte or opaque.

On the inside of the respective lower foil sheet, line portions, designated in an exemplary manner as 27, 28, 29, in a particular width are provided, which have been produced in that the initial roughness provided therein has been smoothed, so that the foil sheet in these line portions 27, 28, 29 is not matte but transparent. The line portions 27, 28, 29 extend transversal to the predetermined movement direction, when passing through the laminating unit 1. They are configured parallel to one another, extend over the entire width of the laminating foils 21, 22, 23 and have the same width. The line portions 27, 28, 29 can also be provided in the top foil sheet, thus so that they are registered.

The distance of the line portions 27, 28, 29 is significant for the thickness of the laminating foils 21, 22, 23. In the present embodiment, the line portions 27 of the upper laminating foil 21 have a large distance, because the laminating foil 21 is particularly thick, e.g. 200 μm, while the line portions 28 of center laminating foils 22 have a much smaller distance. This distance is significant for an average thickness of the laminating foil, e.g. 120 μm. For the laminating foil 23 sitting on the sheet support 15, the distance of the line portions 29 is much smaller than for the laminating foil 22, wherein the distance is characteristic here for a laminating foil 24 with smaller thickness, e.g. 80 μm.

A laminating process is performed as follows: after inserting the sheet material to be laminated between the two foil sheets of a laminating foil, thus in an exemplary manner, the laminating foil 23, the combination of both is placed onto the sheet support 15 as evident from FIG. 3. When the laminating unit 1 is turned on, the laser scanner 20 scans the number of the line portions detected over a particular scan angle (also the distance between the line portions 29 can be detected). According to the read out number of the line portions 29, depending on the design of the laminating unit 1, either the pass-through velocity through the pass-through channel 8, this means the speed of the laminating rollers 12, 13, is adjusted to a high value and/or the temperature of the laminating rollers 12, 13 is adjusted to a low value. This is performed because the laminating foil 23 as described supra only has a small thickness and thus also only has a low heat capacity; this means it is heated to the optimum temperature for the laminating process with a small amount of heat. Simultaneously, the laminating gap 14 as an adaption to the thickness of the laminating foil 23 is adjusted, so that the pressure necessary for the laminating process is reached.

Figure 2:
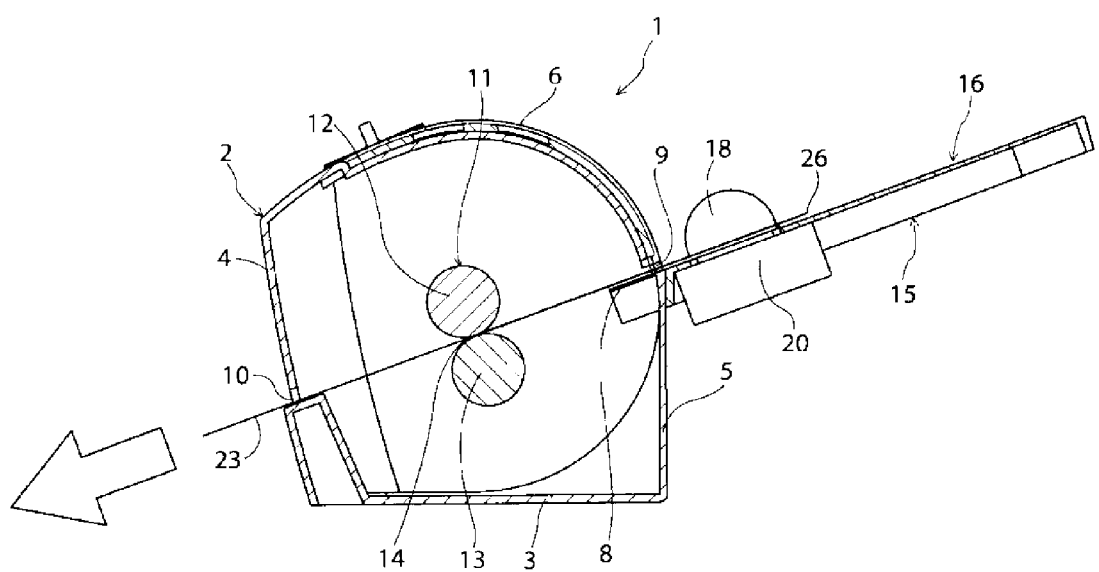
FIG. 2 illustrates a laminating unit according to FIG. 1 in cross section.
Figure 4:
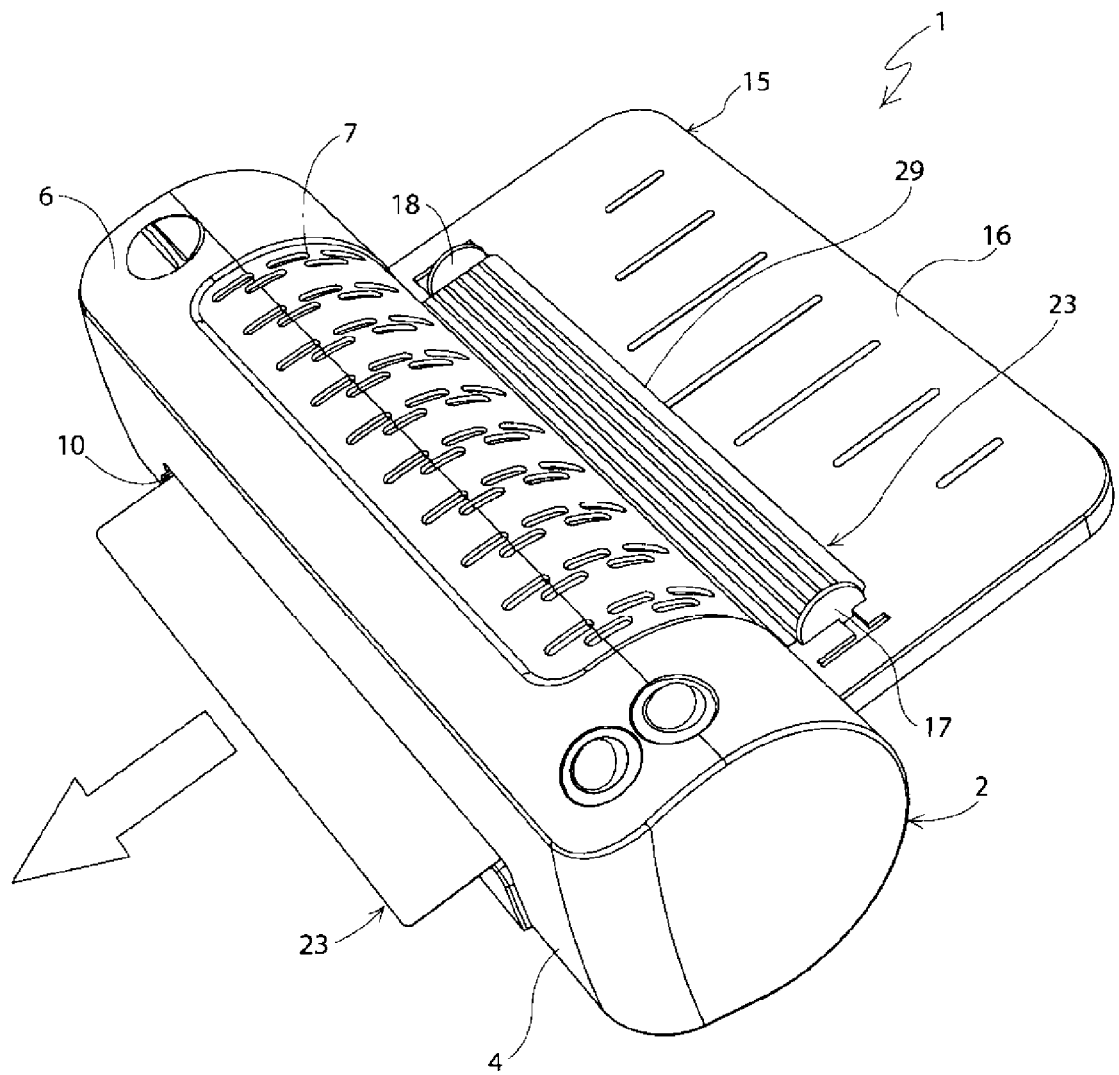

The laminating foil 23 or the combination of laminating foil 23 and inserted sheet material is then pushed through the feed opening 9 in the direction towards the laminating rollers 12, 13. At this location, it is captured by the laminating rollers 12, 13, and transported through the laminating gap 14 under the effect of pressure and heat (re. FIGS. 2 and 4). After leaving the laminating gap 14, it protrudes from the exit opening 10 and can be pulled out of the laminating unit 1 from there.

During laminating, this means when passing through the laminating gap 14, the glue layers at the insides of the foil sheets of the laminating foil 23 are melted, so that the laminating foil 23 becomes overall clear and transparent. Thus, the roughness of the inside of the foil sheet, on which the line portions 29 are configured, adapts itself to the roughness of the line portions 29, so that the initial contrast between the line portions 29 and the portions located there between disappears. The marking of the laminating foil 23 through the line portions 29 thus is not visible anymore after the laminating process, this means the original marking does not distract from the appearance of the finished laminated product anymore.

This certainly also holds for the laminating foils 21, 22. When they are being used for laminating, the laser scanner 20 reads out a respective lower number of marking lines 28 or 27 with the consequence that the pass-through velocity, this means the speed of the laminating rollers 12, 13 is reduced and/or the temperature of the laminating rollers 12, 13 is increased when the thickness of the laminating foils 21, 22 is increased. Simultaneously, the laminating gap 14 is increased accordingly.

What is claimed is:

1. A laminating unit for hot laminating sheet material and laminating foil, comprising:
   a housing, through which a pass-through channel extends, starting at a feed opening for passing through a combination of sheet material and laminating foil, and in which a laminating apparatus is disposed, which is associated with the pass-through channel and in which the combination is laminated through contact pressure and increased temperature,
   wherein a transport apparatus is disposed in the housing for transporting the combination in the pass-through channel with a particular pass-through velocity,
   wherein the temperature or the pass-through velocity is adjustable,
   wherein the laminating unit includes a sensor, which reads out a marking encoding at least one physical property of the laminating foil and configured as a surface pattern on a surface of the laminating foil,
   wherein the contact pressure is applied by the laminating apparatus to the surface of the laminating foil,
   wherein the surface pattern includes surface portions, whose roughness differs from an initial roughness at least on one side of the laminating foil before laminating,
   wherein the sensor generates a signal for a display apparatus or for a control apparatus as a function of the read out marking, and
   wherein the control apparatus is connected to the laminating apparatus or the transport apparatus and configured, so that the control apparatus adjusts the temperature of the laminating apparatus or the pass-through velocity of the transport apparatus as a function of the read out marking.

2. The laminating unit according to claim 1,
   wherein the laminating apparatus includes at least one roller pair with two laminating rollers forming a laminating gap,
   wherein at least one of the rollers is heatable through a heater, and
   wherein at least one of the laminating rollers is part of the transport apparatus and the transport apparatus has an electrical drive through which the laminating roller(s) is or are rotatable.

3. The laminating unit according to claim 1,
   wherein the sensor is disposed in pass-through direction in front of the laminating apparatus,
   wherein a sheet support is provided beyond the feed opening at the housing as an extension of the pass-through channel, and
   wherein the sensor is integrated into the sheet support.

4. The laminating unit according to claim 1, wherein the sensor is configured as an optical sensor.

5. The laminating unit according to claim 1, wherein the sensor is configured to read out surface portions with different reflectivity or absorption.

6. The laminating unit according to claim 1,
   wherein the sensor is supported, so that it is movable transversal to the pass-through direction in the pass-through channel,
   wherein the laminating unit has two movable side stops for centric insertion of the laminating foils, and
   wherein the sensor is connected with one of the side stops.

7. The laminating unit according to claim 1, wherein the laminating apparatus includes a laminating gap in the pass-through channel, in which laminating gap the combination is loaded with the contact pressure and the increased temperature, and a height of the laminating gap is adjustable as a function of the signal of the sensor, or automatically adjusted through a control apparatus.

8. A laminating system, comprising the laminating unit according to claim 1.

9. The laminating unit of claim 1, wherein the marking encoding includes lines extending an entire width or length of the laminating foil the laminating foil.

10. The laminating unit of claim 9, wherein line portions extend at a slant angle to the pass-through direction.

11. The laminating unit of claim 9, wherein line portions extend at a parallel angle to the pass-through direction.

12. A laminating unit for hot laminating sheet material and laminating foil, comprising:
    a housing, through which a pass-through channel extends, starting at a feed opening for passing through a combination of sheet material and laminating foil, and in which a laminating apparatus is disposed, which is associated with the pass-through channel and in which the combination is laminated through contact pressure and increased temperature,
    wherein a transport apparatus is disposed in the housing for transporting the combination in the pass-through channel with a particular pass-through velocity,
    wherein the temperature or the pass-through velocity is adjustable,
    wherein the laminating unit includes a sensor for reading out a marking encoding at least one physical property of the laminating foil and configured as a surface pattern on a surface of the laminating foil,
    wherein the contact pressure is applied by the laminating apparatus to the surface of the laminating foil,
    wherein the surface pattern includes surface portions, whose roughness differs from an initial roughness at least on one side of the laminating foil before laminating, wherein the sensor generates a signal for a display apparatus or for a control apparatus as a function of the read out marking, wherein the control apparatus is connected to the laminating apparatus or the transport apparatus and configured, so that the control apparatus adjusts the temperature of the laminating apparatus or the pass-through velocity of the transport apparatus as a function of the read out marking, and wherein the marking disappears when the laminating foil passes through the laminating apparatus.

13. A laminating unit for hot laminating sheet material and laminating foil, comprising:

a housing, through which a pass-through channel extends, starting at a feed opening for passing through a combination of sheet material and laminating foil, and in which a laminating apparatus is disposed, which is associated with the pass-through channel and in which the combination is laminated through contact pressure and increased temperature; and a pair of laminating rollers separated from each other by a distance, wherein a transport apparatus is disposed in the housing for transporting the combination in the pass-through channel with a particular pass-through velocity, wherein at least one of the distance, the temperature or the pass-through velocity is adjustable, wherein the laminating unit includes a sensor, which reads out a marking encoding at least one physical property of the laminating foil and configured as a surface pattern on a surface of the laminating foil, wherein the contact pressure is applied by the laminating apparatus to the surface of the laminating foil, wherein the surface pattern includes surface portions, whose roughness differs from an initial roughness at least on one side of the laminating foil before laminating, wherein the sensor generates a signal for a display apparatus or for a control apparatus as a function of the read out marking, which control apparatus is connected to the laminating apparatus or the transport apparatus and configured, so that the control apparatus adjusts at least one of the distance, the temperature of the laminating apparatus or the pass-through velocity of the transport apparatus, as a function of the read out marking.

14. The laminating unit of claim 13, wherein the control apparatus adjusts the distance as a function of the read out marking.

15. The laminating unit of claim 13, wherein, the control apparatus adjusts the temperature of the laminating apparatus as a function of the read out marking.

16. The laminating unit of claim 13, wherein the control apparatus adjusts the pass-through velocity of the transport apparatus as a function of the read out marking.

17. The laminating unit of claim 13, wherein the marking encoding includes lines extending an entire width or length of the laminating foil the laminating foil.

18. The laminating unit of claim 17, wherein line portions extend at a slant angle to the pass-through direction.

19. The laminating unit of claim 17, wherein line portions extend at a parallel angle to the pass-through direction.

* * * * *